(12) United States Patent
Jasmin

(10) Patent No.: US 12,541,804 B2
(45) Date of Patent: *Feb. 3, 2026

(54) POWER CONTROL DEVICE

(71) Applicant: Systemex Energies Inc., Mont-Royal (CA)

(72) Inventor: Simon Jasmin, Montreal (CA)

(73) Assignee: Systemex Energies Inc., Laval (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/539,894

(22) Filed: Dec. 14, 2023

(65) Prior Publication Data

US 2024/0119545 A1 Apr. 11, 2024

Related U.S. Application Data

(63) Continuation of application No. 17/466,146, filed on Sep. 3, 2021, now Pat. No. 11,948,209, which is a continuation of application No. 16/455,398, filed on Jun. 27, 2019, now Pat. No. 11,126,212, which is a continuation of application No. PCT/CA2018/050174, filed on Feb. 15, 2018.

(60) Provisional application No. 62/459,544, filed on Feb. 15, 2017.

(51) Int. Cl.

| | |
|---|---|
| *G06Q 50/06* | (2024.01) |
| *G05B 15/02* | (2006.01) |
| *G05F 1/66* | (2006.01) |
| *H02J 3/28* | (2006.01) |
| *H02J 3/30* | (2006.01) |
| *H02J 3/32* | (2006.01) |
| *H02J 15/00* | (2006.01) |

(52) U.S. Cl.
CPC ............. *G06Q 50/06* (2013.01); *G05B 15/02* (2013.01); *G05F 1/66* (2013.01); *H02J 3/28* (2013.01); *H02J 3/30* (2013.01); *H02J 3/32* (2013.01); *H02J 15/007* (2020.01)

(58) Field of Classification Search
None
See application file for complete search history.

(56) References Cited

U.S. PATENT DOCUMENTS

| | | |
|---|---|---|
| 4,130,874 A | 12/1978 | Pai |
| 4,215,394 A | 7/1980 | Berman et al. |
| 4,308,465 A | 12/1981 | Lafuze |

(Continued)

FOREIGN PATENT DOCUMENTS

| | | |
|---|---|---|
| CA | 2520765 | 12/2004 |
| CA | 2791889 | 12/2004 |

(Continued)

OTHER PUBLICATIONS

Examiner's Report in Canadian Appln. No. 3,147,955, dated May 22, 2024, 5 pages.

(Continued)

*Primary Examiner* — Kamini S Shah
*Assistant Examiner* — Istiaque Ahmed
(74) *Attorney, Agent, or Firm* — Fish & Richardson P.C.

(57) ABSTRACT

A controller for controlling an energy discharge from an energy saving device to a power grid. The system includes decision logic to implement a local response responsive to events currently occurring in a power grid and in addition remote commands sent from a remote location.

16 Claims, 10 Drawing Sheets

(56) References Cited

U.S. PATENT DOCUMENTS

| | | |
|---|---|---|
| 4,317,049 A | 2/1982 | Schweppe |
| 4,359,644 A | 11/1982 | Foord |
| 4,409,491 A | 10/1983 | Schott |
| 4,419,665 A | 12/1983 | Gurr et al. |
| 4,471,232 A | 9/1984 | Peddie et al. |
| 4,626,698 A | 12/1986 | Harnden et al. |
| 4,674,031 A | 6/1987 | Siska |
| 4,847,781 A | 7/1989 | Brown et al. |
| 5,191,520 A | 3/1993 | Eckersley |
| 5,424,903 A | 6/1995 | Schreiber |
| 5,442,335 A | 8/1995 | Cantin et al. |
| 6,489,834 B2 | 12/2002 | Naffziger et al. |
| 6,490,448 B1 | 12/2002 | Hogberg et al. |
| 6,633,823 B2 | 10/2003 | Barton et al. |
| 7,010,363 B2 | 3/2006 | Donnelly et al. |
| 7,149,605 B2 | 12/2006 | Chassin et al. |
| 7,420,293 B2 | 9/2008 | Donnelly et al. |
| 7,464,551 B2 | 12/2008 | Althaus et al. |
| 7,595,613 B2 | 9/2009 | Thompson et al. |
| 7,660,649 B1 | 2/2010 | Hope et al. |
| 7,702,424 B2 | 4/2010 | Cannon et al. |
| 7,830,037 B2 | 11/2010 | Hirst |
| 7,839,027 B2 | 11/2010 | Shelton et al. |
| 7,925,597 B2 | 4/2011 | Takano et al. |
| 8,073,573 B2 | 12/2011 | Chassin et al. |
| 8,183,826 B2 | 5/2012 | Tuffner et al. |
| 8,204,632 B2 | 6/2012 | Abi-Samra |
| 8,205,106 B2 | 6/2012 | Boss et al. |
| 8,319,599 B2 | 11/2012 | Aisa et al. |
| 8,396,607 B2 | 3/2013 | Hirst |
| 8,478,452 B2 | 7/2013 | Pratt et al. |
| 8,558,511 B2 | 10/2013 | Hammerstrom |
| 8,590,802 B2 | 11/2013 | Hammerstrom |
| 8,600,573 B2 | 12/2013 | Black et al. |
| 8,700,225 B2 | 4/2014 | Pratt et al. |
| 8,996,183 B2 | 3/2015 | Forbes |
| 9,698,616 B2 | 7/2017 | Mohagheghi et al. |
| 9,960,637 B2 | 5/2018 | Sanders et al. |
| 11,126,212 B2 | 9/2021 | Jasmin |
| 11,948,209 B2 | 4/2024 | Jasmin |
| 2003/0230935 A1 | 12/2003 | Radley |
| 2007/0198133 A1 | 8/2007 | Hirst |
| 2007/0213880 A1 | 9/2007 | Ehlers |
| 2007/0222294 A1 | 9/2007 | Tsukida |
| 2008/0167756 A1* | 7/2008 | Golden ............... G05F 1/66 700/297 |
| 2008/0281663 A1 | 11/2008 | Hakim et al. |
| 2009/0319415 A1 | 12/2009 | Stoilov et al. |
| 2010/0038966 A1 | 2/2010 | Espeut |
| 2010/0070103 A1 | 3/2010 | Flec et al. |
| 2010/0114387 A1 | 5/2010 | Chassin |
| 2010/0141463 A1 | 6/2010 | Schweitzer |
| 2010/0218006 A1 | 8/2010 | Boss et al. |
| 2010/0219808 A1 | 9/2010 | Steckley et al. |
| 2010/0244563 A1 | 9/2010 | Fleck |
| 2010/0292855 A1 | 11/2010 | Kintner |
| 2011/0084664 A1 | 4/2011 | White et al. |
| 2011/0118894 A1 | 5/2011 | Reinecci |
| 2011/0147360 A1 | 6/2011 | Hammerstrom |
| 2011/0172837 A1 | 7/2011 | Forbes |
| 2011/0190958 A1 | 8/2011 | Hirst |
| 2011/0202418 A1 | 8/2011 | Kempton et al. |
| 2011/0204720 A1 | 8/2011 | Ruiz et al. |
| 2011/0270452 A1 | 11/2011 | Lu et al. |
| 2012/0200160 A1 | 8/2012 | Pratt et al. |
| 2012/0242148 A1* | 9/2012 | Galati ............... H02J 3/28 307/39 |
| 2012/0323396 A1 | 12/2012 | Shelton et al. |
| 2013/0015663 A1 | 1/2013 | Kumula et al. |
| 2013/0110260 A1 | 5/2013 | Carpinteri et al. |
| 2013/0173075 A1 | 7/2013 | Mitsumoto et al. |
| 2013/0173331 A1 | 7/2013 | Mohagheghi et al. |
| 2013/0268132 A1 | 10/2013 | Pratt et al. |
| 2013/0274945 A1 | 10/2013 | Ganu et al. |
| 2013/0282181 A1 | 10/2013 | Lu et al. |
| 2013/0320762 A1 | 12/2013 | Trudel et al. |
| 2014/0037275 A1 | 2/2014 | Flohr |
| 2014/0070756 A1* | 3/2014 | Kearns ............... H02J 13/00034 320/101 |
| 2014/0183961 A1* | 7/2014 | Schrock ............... H02J 3/0012 307/102 |
| 2014/0225564 A1 | 8/2014 | North et al. |
| 2014/0285154 A1 | 9/2014 | Mohagheghi et al. |
| 2014/0365025 A1* | 12/2014 | Forbes, Jr. ............... G05F 1/66 700/295 |
| 2015/0160672 A1 | 6/2015 | Hakim et al. |
| 2016/0072288 A1* | 3/2016 | Debone ............... G06Q 10/06 700/295 |
| 2016/0178678 A1 | 6/2016 | Pelletier et al. |
| 2016/0226249 A1 | 8/2016 | Sakuma et al. |
| 2016/0370806 A1 | 12/2016 | North et al. |
| 2017/0179722 A1* | 6/2017 | Porter ............... H02J 3/32 |
| 2018/0123347 A1* | 5/2018 | Shizuno ............... H02J 7/00 |
| 2018/0226823 A1* | 8/2018 | Ashcraft ............... H02J 7/1423 |
| 2019/0041886 A1 | 2/2019 | Hakim et al. |
| 2019/0324486 A1 | 10/2019 | Jasmin |
| 2020/0052487 A1 | 2/2020 | Trudel et al. |
| 2022/0236757 A1 | 7/2022 | Jasmin |

FOREIGN PATENT DOCUMENTS

| | | | |
|---|---|---|---|
| CA | 2778345 | 8/2012 | |
| CA | 2817822 | 8/2012 | |
| CA | 2856433 | 8/2012 | |
| CA | 2809896 | 5/2013 | |
| CA | 2920582 A1 * | 2/2015 | ............. B60L 53/63 |
| DE | 4020294 | 1/1992 | |
| GB | 2361118 | 10/2001 | |
| GB | 2407440 | 4/2005 | |
| GB | 2426878 | 12/2006 | |
| JP | 2002-300725 | 10/2002 | |
| WO | WO 1994006191 | 3/1994 | |
| WO | WO 1997026696 | 7/1997 | |
| WO | WO 2005029670 | 3/2005 | |
| WO | WO 2013010266 | 1/2013 | |
| WO | WO 2017193214 | 11/2017 | |
| WO | WO 2019178683 | 9/2019 | |

OTHER PUBLICATIONS

Lee et al., "Coordinated control algorithm for distributed battery energy storage systems for mitigating voltage and frequency deviations," IEEE Transactions on Smart Grid, Jun. 2015, 7(3):1713-22.

Advisory Action in U.S. Appl. No. 14/404,833, dated Apr. 4, 2019, 3 pages.

Agyeman et al., "Dynamic Demand Challenge," Nesta: Centre for Challenge Prizes, Jun. 2014, 32 pages.

DynamicDemand.com [online], "Welcome to Dynamic Demand," upon information and belief, available no later than Sep. 18, 2004, retrieved on Jun. 30, 2020, retrieved from URL <http://www.dynamicdemand.co.uk/index.htm>, 1 page.

Examiner Report in Canadian application 2,309,896, dated Feb. 17, 2015, 3 pages.

Examiner Report in Canadian application 2,778,345 dated Oct. 3, 2012, 3 pages.

Examiner Report in Canadian application 2,809,896 dated Dec. 4, 2013, 4 pages.

Examiner Report in Canadian application 2,809,896 dated Jul. 9, 2013, 5 pages.

Examiner Report in Canadian application 2,817,822, dated Jul. 29, 2013, 4 pages.

Examiner Report in Canadian application 2,817,822, dated Jun. 23, 2015, 3 pages.

Examiner Report in Canadian Appln. 2,856,433, dated Aug. 25, 2014, 3 pages.

Examiner Report in Canadian Appln. 2,856,433, dated Jul. 6, 2015, 6 pages.

Examiner Report in Canadian Appln. 2,925,490 dated Aug. 21, 2017, 3 pages.

(56) References Cited

OTHER PUBLICATIONS

Examiner Report in Canadian Appln. 2,925,490 dated Jul. 13, 2018, 3 pages.
Examiner Report in Canadian Appln. 2,925,490 dated May 6, 2019, 2 pages.
Examiner Report in Canadian Appln. 2,925,490 dated Sep. 20, 2016, 20 pages.
Examiner's Report dated Jul. 23, 2015, in connection with Canadian application 2,809,896, 8 pages.
Examiner's Report in Canadian Appln. No. 2,874,947, dated Mar. 28, 2019, 4 pages.
Examiner's Report in Canadian Appln. No. 2,920,582, dated Sep. 28, 2020, 3 pages.
Examiner's Report in Canadian Appln. No. 2,921,065, dated Mar. 10, 2020, 3 pages.
Examiner's Report in Canadian Appln. No. 2,921,065, dated May 2, 2018, 4 pages.
Examiner's Report in Canadian Appln. No. 3,051,063, dated Jan. 16, 2020, 4 pages.
Examiner's Report in Canadian Appln. No. 3,051,063, dated Sep. 11, 2019, 4 pages.
Extended European Search Report in European Appln. No. 13796465.6, dated Feb. 3, 2016, 8 pages.
Final Office Action in U.S. Appl. No. 14/910,649, dated Jun. 24, 2020, 8 pages.
Flohr, "Making the Case for Grid-Interactive Electric Water Heating in 2014," Presented at the 15 PLMA Spring Conference, Denver, CO, USA, Apr. 14, 2014, 18 pages.
Hill et al., "Battery Energy Storage for Enabling Integration of Distributed Solar Power Generation," IEEE Transactions on Smart Grid, Jun. 2012, 3(2):850-857.
International Preliminary Report on Patentability in International Appln. No PCT/CA2018/050174, mailed on Aug. 29, 2019, 7 pages.
International Search Report in International Appln. No. PCT/IB2014/002094 dated Jun. 11, 2015, 6 pages.
International Search Report dated Dec. 5, 2013, in connection with PCT/CA2013/000538, 6 pages.
International Search Report in International Application No. PCT/CA2018/050174, mailed on Apr. 18, 2018, 8 pages.
International Search Report in International Appln. No. PCT/CA2017/050563, dated Aug. 17, 2017, 4 pages.
International Search Report in International Appln. No. PCT/CA2019/050335, dated Jul. 8, 2019, 4 pages.
International Search Report in International Appln. No. PCT/IB2014/003090, dated Jun. 15, 2015, 3 pages.
Jahal et al., "Supporting Cold Load Pickup with Demand Response," National Town Hall Meeting on Demand Response and Smart Grid, May 26-28, 2015, Washington, DC, USA, 9 pages.
Notice of Allowance in Canadian application 2,817,822, dated Feb. 7, 2014, 1 page.
Notice of Allowance in Canadian Appln. 2,925,490 dated Feb. 21, 2020, 1 page.
Notice of Allowance in U.S. Appl. No. 14/910,643, dated Apr. 7, 2020, 5 pages.
Notice of Allowance in U.S. Appl. No. 15/385,474, dated Apr. 6, 2020, 9 pages.
Notice of Intention to Grant in European Appln. No. 13796465.6, dated Jul. 2, 2018, 8 pages.
Notice of Non-compliant amendment in U.S. Appl. No. 13/682,824, dated Oct. 17, 2016, 4 pages.
Office Action in U.S. Appl. No. 13/682,824, dated Feb. 2, 2016, 19 pages.
Office Action in U.S. Appl. No. 14/404,883 dated Feb. 21, 2019, 9 pages.
Office Action in U.S. Appl. No. 14/404,883, dated Feb. 27, 2017, 3 pages.
Office Action in U.S. Appl. No. 14/404,883, dated May 31, 2018, 7 pages.
Office Action in U.S. Appl. No. 14/910,643, dated Jun. 22, 2018, 15 pages.
Office Action in U.S. Appl. No. 14/910,643, dated May 1, 2019, 7 pages.
Office Action in U.S. Appl. No. 14/910,643, dated Nov. 20, 2019, 7 pages.
Office Action in U.S. Appl. No. 14/910,649 dated Jan. 4, 2019, in connection with, 11 pages.
Office Action in U.S. Appl. No. 14/910,649, dated Aug. 7, 2019, 3 pages.
Office Action in U.S. Appl. No. 14/910,649, dated May 1, 2019, 6 pages.
Office Action in U.S. Appl. No. 14/910,649, dated Nov. 29, 2019, 6 pages.
Office Action in U.S. Appl. No. 15/385,474 dated Apr. 5, 2019, 5 pages.
Office Action in U.S. Appl. No. 15/385,474, dated Jun. 29, 2018, 37 pages.
Open Energi, "CERT Final Report," Open Energi, May 2, 2012, 67 pages.
Open Energi, "Demand Response Market Overview," Open Energi, Apr. 2013, 7 pages.
Oudalov et al., "Optimizing a Battery Energy Storage System for Primary Frequency Control", IEEE Transactions on Power Systems, vol. 22, No. 3, pp. 1259-1266, Aug. 2007.
Pacific Northwest National Laboratory, "Pacific Northwest GridWise Testbed Demonstration Projects; Part II. Grid Friendly Appliance Project," Prepared for the United States Department of Energy, Oct. 2007, PNNI-17079, 123 pages.
PowerCentsDC, "PowerCentsDC Program Interim Report," PowerCentsDC, Nov. 2009, 52 pages.
Power-Grid Load Balancing by Using Smart Home Appliances,— Ricci, A.; Vinerba, B.; Smarglassi, E.; De Munari, I. Aisa, V.; Ciampolini, P. Consumer Electronics, 2008. ICCE 2008. Digest of Technical Papers. International Conference on, vol., No. 1 pp. 1.
RenewableEnergyFocus.com, "Indesit RLtec and power dynamic demand smart grid technology," Nov. 2009, retrieved on Jun. 30, 2020, retrieved from URL <http://www.renewableenergyfocus.com/view/5041/indesit-rttec-and-npower-dynamic-demand-smart-grid-technology/>, 1 page.
Restriction Requirement in U.S. Appl. No. 13/632,824, dated Jul. 14, 2015, 9 pages.
Restriction Requirement in U.S. Appl. No. 14/910,649, dated May 24, 2018, 5 pages.
Slideshare.net [online],"Introduction to Wrap Technology" Oct. 2010, retrieved on Jun. 30, 2020, retrieved from URL <http://www.slideshare.net/valsal/introduction-to-wrap-technology-october-2010>, 24 pages.
TheGuardian.com [online], "How smart fridges could slash Uk CO2 emissions and help renewables," Apr. 2009, retrieved on Jun. 30, 2020, retrieved from URL<http://www.theguardian.com/environment/2009/apr/27/carbon-emissions-smart-fridges-environmentally-friendly-appliances>, 7 pages.
U.S. Department of Energy, "Benefits of Demand Response in Electricity Markets and Recommendations for Achieving Them Report to Congress," Report to the United States Congress Pursuant to Section 1252 of the Energy Policy Act of 2005, Feb. 2005, 122 pages.
Written Opinion in International Appln. No. PCT/CA2013/000538 dated Sep. 19, 2013, 7 pages.
Written Opinion in International Appln. No. PCT/CA2017/050563, dated Aug. 17, 2017, 6 pages.
Written Opinion in International Appln. No. PCT/CA2019/050335, dated Jul. 8, 2019, 4 pages.
Written Opinion in International Appln. No. PCT/IB2014/002094, dated Jun. 11, 2015, 10 pages.
Written Opinion in International Appln. No. PCT/IB2014/003090, dated Jun. 15, 2015, 6 pages.
Written Opinion in International Appln. PCT/CA2018/050174 dated Apr. 18, 2018, 3 pages.
Xu et al., "Integrated V2G, G2V, and Renewable Energy Sources Coordination Over a Converged Fiber-Wireless Broadband Access Network," IEEE Transactions on Smart Grid, May 2013, 4(3):1381-1390.

(56) References Cited

OTHER PUBLICATIONS

Yao et al., "Determination of Short-Term Power Dispatch Schedule for a Wind Farm Incorporated with Dual-Battery Energy Storage Scheme," IEEE Transactions on Sustainable Energy, Jan. 2012, 3(1):74-84.

Yilmaz et al., "Review of the impact of Vehicle to Odd Technologies on Distribution Systems and Utility Interfaces," IEEE Transactions on Power Electronics, Dec. 2013, 28(12):5673-5689.

\* cited by examiner

POWER CONTROL DEVICE

CROSS-REFERENCE TO RELATED APPLICATIONS

This application is a continuation application of and claims the benefit of priority to U.S. application Ser. No. 17/466,146, filed on Sep. 3, 2021, which is a continuation of U.S. application Ser. No. 16/455,398, filed on Jun. 27, 2019, now U.S. Pat. No. 11,126,212, which is a continuation of International Application No. PCT/CA2018/050174, filed on Feb. 15, 2018, which claims the benefit of priority to U.S. Application No. 62/459,544, filed on Feb. 15, 2017, the contents of which are hereby incorporated by reference.

FIELD OF THE INVENTION

The present invention relates to a controller for controlling an energy discharge from an energy saving device to a power grid.

BACKGROUND

To ensure the reliability of an electric power grid, the administrator must continually maintain a power reserve in order to compensate for a possible failure of energy production units. The power reserve is essentially an excess production capacity on standby. In normal conditions, the power generation units are run at less than 100% such that a degree of reserve power is always available. However, the maintenance of this reserve capacity is an expensive proposition since the reserve constitutes a resource that cannot be effectively monetized by the utility company.

An electric power grid will operate in normal conditions at a fixed frequency (usually 50 or 60 Hz). The frequency remains constant as long as the supplied power matches the power consumed by the load. Any sudden changes in generation or load resulting in an imbalance between generation and load will lead to a frequency instability during which the frequency deviates from its nominal value. Large frequency variations are undesirable because they could lead to equipment trip or even a system collapse.

Frequency instability events are generally caused by the sudden loss of a power generation unit or by the loss of a large load and are characterized by a sudden frequency variation from the frequency nominal value.

The reserve capacity in a power grid is thus tapped when the frequency drops below a certain level. Electrical generation units that supply power to the grid are equipped with a speed governor. The speed governor continuously regulates the power output of generation units in order to balance the generation with the load. Thus when the frequency of the grid varies, the speed governor responds to this variation to compensate it. For example, when the frequency is higher than normal, the speed governor will simply lower the power generated by the generation unit (therefore reducing the amount of power supplied to the grid). Alternatively, when the frequency is lower than normal, the speed governor will increase the power generation. The speed governor however has some inherent limitations. In particular, it is slow to respond since it involves certain mechanical constraints. Depending of the type of generation (hydraulic, gas, thermal, wind, etc....) some time is required for the generation unit to increase its speed up to the desired point.

System inertia is another aspect to frequency stability of the power grid. "Inertia" refers to the ability of the grid to buffer energy imbalances, such as excess load or excess generation and thus prevent significant and rapid frequency variations. Any power grid has a level of inherent inertia on its generation side. This inherent inertia is in the form of mechanical energy stored in the rotors of the generators. If the load on the power grid increases, the rotor inertia of a generator will be able to instantly respond to this increased load and thus dampen a frequency drop. Similarly, if the load connected to the grid is suddenly reduced, the rotor inertia will limit its tendency to overspeed, hence increase the frequency of the supply voltage.

Accordingly, it is desirable to provide improved devices and methods configured for providing support to the power grid in instances of imbalance between power generation and load, during which the frequency of the electrical energy in the power grid varies from a nominal value.

BRIEF DESCRIPTION OF THE DRAWINGS

A detailed description of non-limiting examples of implementation of the present invention is provided hereinbelow with reference to the following drawings, in which.

Figure 1:
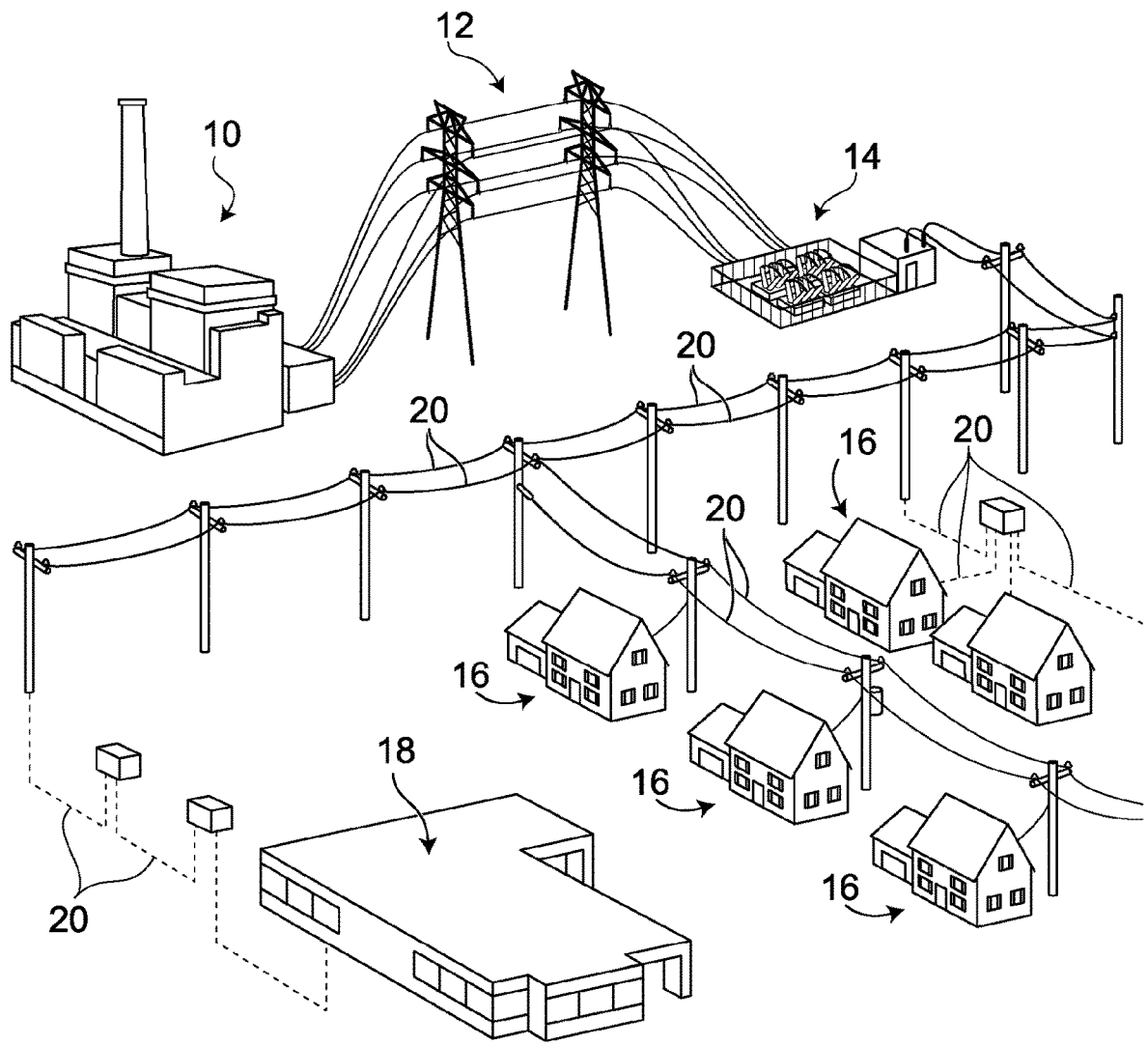
FIG. 1 shows an example of an electric power grid according to an embodiment of the invention and illustrating the power generation side and the distributed load side of the power grid.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION OF THE EMBODIMENTS OF THE INVENTION

To facilitate the description, any reference numeral designating an element in one figure will designate the same element if used in any other figure. In describing the embodiments, specific terminology is used but the invention is not intended to be limited to the specific terms so selected.

FIG. 1 shows an electric power grid according to an embodiment of the invention. Electricity is generated at a power plant 10 and is transmitted over high voltage transmission lines 12 to a voltage down step station 14. The voltage down step station 14 lowers the electrical voltage (via transformers for example) such that it may be distributed to households 16 and industrial buildings 18 via residential distribution lines 20.

The electric power grid of FIG. 1 may be "isolated" when it exhibits a limited number of connections with neighboring grids or "meshed" when it exhibits a large number of connections with neighboring grids.

Figure 2:
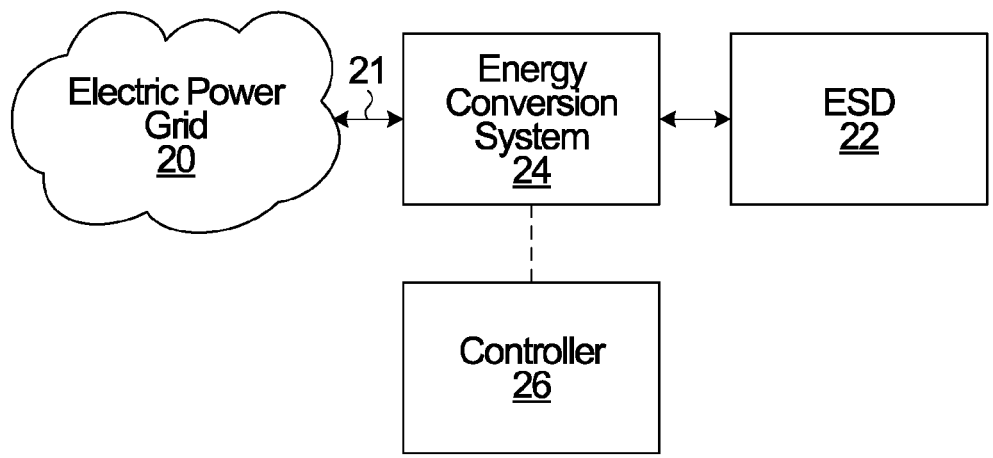
FIG. 2 is a bloc diagram showing an energy storage device, an energy conversion system and a controller used to eliminate or reduce an imbalance between the generation side and the load side of the electric power grid of FIG. 1, in accordance with a non-limiting example of implementation of the invention.

In a non-limiting example of implementation, and with further reference to FIG. 2, the present invention provides an energy storage device (ESD) 22 that may be used to support the electric power grid 20. More specifically, the electric power grid of FIG. 1 comprises a number of loads, notably in the households 16 and industrial buildings 18. In a steady state mode of operation, the electric power grid 20 is characterized by a state of equilibrium between the generation side of the electric power grid 20 (i.e., power plant 10 and the likes) and the load size thereof (i.e., households 16, industrial buildings 18 and the likes).

When this state of equilibrium is lost and there is an imbalance between the generation side of the electric power grid 20 and the load side thereof, in particular when there is a generation deficit resulting from the accidental loss of a generator, the ESD 22 may be used to support the electric power grid by eliminating or reducing the imbalance, over a certain period of time which is largely dependent on the energy storage capacity of the ESD and the degree of imbalance between the generation side and the load side. Note that the ESD can also support the power grid in cases when there is the reverse imbalance; the generation side exceeds the load side. In those circumstances the ESD can be used to take up at least some of the excess energy available in the power grid.

To this end, in this embodiment, the energy conversion system 24 may be adapted to convert the energy stored in the ESD 22 into a form that may be injected into the electric power grid 20 to eliminate or reduce the imbalance that may exist between the generation side of the electric power grid 20 and the load side thereof. A controller 26 is provided to regulate the injection of energy from the ESD 22 into the electric power grid 20 via the energy conversion system 24.

The energy conversion system 24 is coupled to the power grid through a suitable power connection 21. The ESD 22 is in turn connected to the energy conversion system 24 such that power can bi-directionally flow from the ESD 22 to the power grid 20. The controller 26 and the energy conversion system 24 are connected via a data connection through which operational commands or data are transferred. The controller 26 is software based and manages the bidirectional energy transfer.

Figure 3:
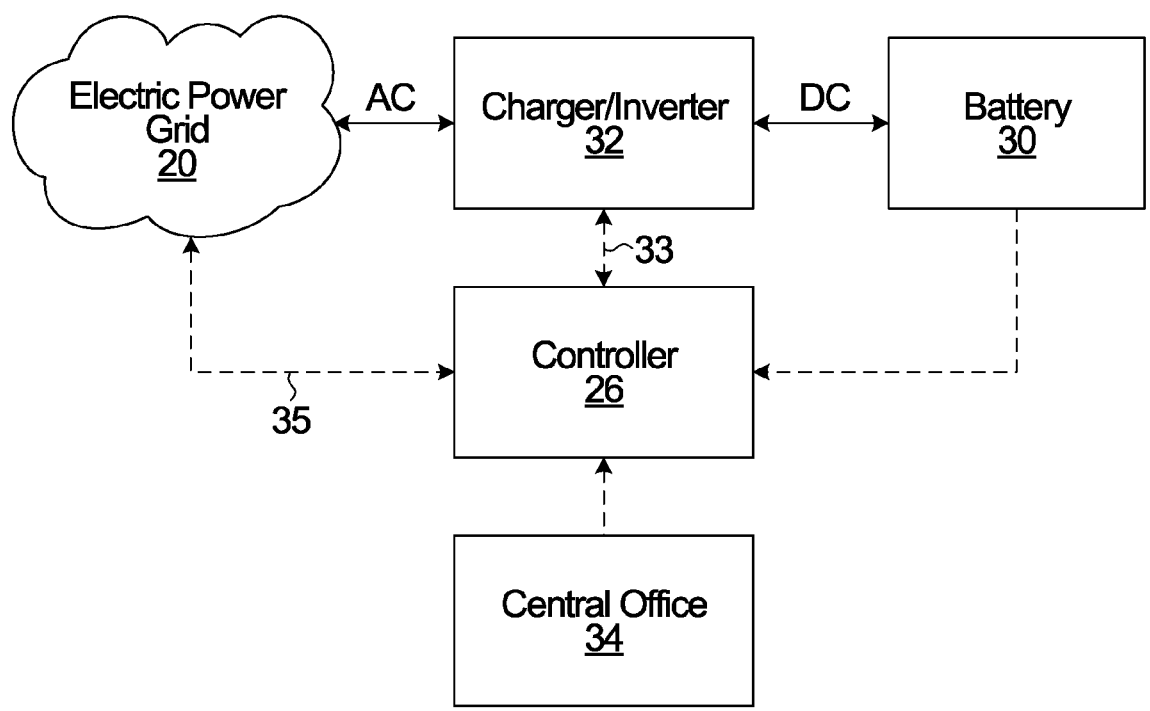
FIG. 3 is a more detailed bloc diagram of FIG. 2.

In a specific example of implementation, and with further reference to FIG. 3, the ESD 22 is a battery 30. Specifically, the battery 30 may be an electrical battery of any chemistry such as, but not limited to, Lithium Ion, Nickel Cadmium, Lead-Acid, Nickel Metal Hydride, Polysulfide Bromide or any other suitable battery technology. In other examples of implementation, the ESD 22 may be any other suitable energy storage technology such as a mechanical fly-wheel, fuel cell, pumped water storage, compressed air or any other suitable chemical, mechanical, electrical or electrochemical apparatus that is adapted to store energy. The ESD 22 may be a stand-alone unit, which is designed for the purpose of supplying AC electric energy to the electric power grid 20. Alternatively, the ESD 22 may be primarily designed to supply a dwelling with electricity and feed the electric power grid 20 only where an excess of electrical energy is available.

In the specific example of implementation where the ESD 22 is a battery, the energy conversion system 24 is a charger/inverter 32. The charger/inverter 32 operates either as a charger or as an inverter depending on the direction of energy flow. The charger/inverter 32 operates as a charger by receiving AC power flow from the electric power grid 20 and converting the incoming electrical energy from AC to DC. When the charger/inverter 32 operates as a charger, the output may therefore be a rectified electrical energy flow, which for convenience is referred to herein as DC, although in some cases the flow may not necessarily be a pure DC one as some ripples are likely to be present. The charger/inverter 32 also operates as an inverter by receiving DC power flow generated by the battery 30 and converting it into AC form for injection in the grid 20.

The controller 26 manages the operation of the charger/inverter 32 via the data communication line 33. The controller 26 also receives at an input 35 information on a characteristic of the electrical energy in the power grid which is indicative of the state of equilibrium between the generation side and the load side. In a specific example of implementation, the input 35 senses the frequency of the electrical energy in the power grid. Practically, the input can be designed to sense the frequency at the power connections 21 between the charger/inverter 32 and the power grid 20. Alternatively, the input 35 can be connected to the charger/inverter 32 where the frequency information is also available.

The controller 26 is also connected to a central office 34 via a distinct data communication channel.

In the example illustrated in FIG. 3, the data communication lines are separate from the electrical power grid 20. The data communication lines may be wireless or wired, such as but not limited to in the case of Internet, GSM communications and the likes. In other examples, data may also be communicated directly via the electric power grid 20, specifically via frequency encoded messages accomplished by varying a frequency of the AC supply from the electric power grid 20. An example of this approach is notably described in Canadian Patent No. 2,778,345.

Figure 4:
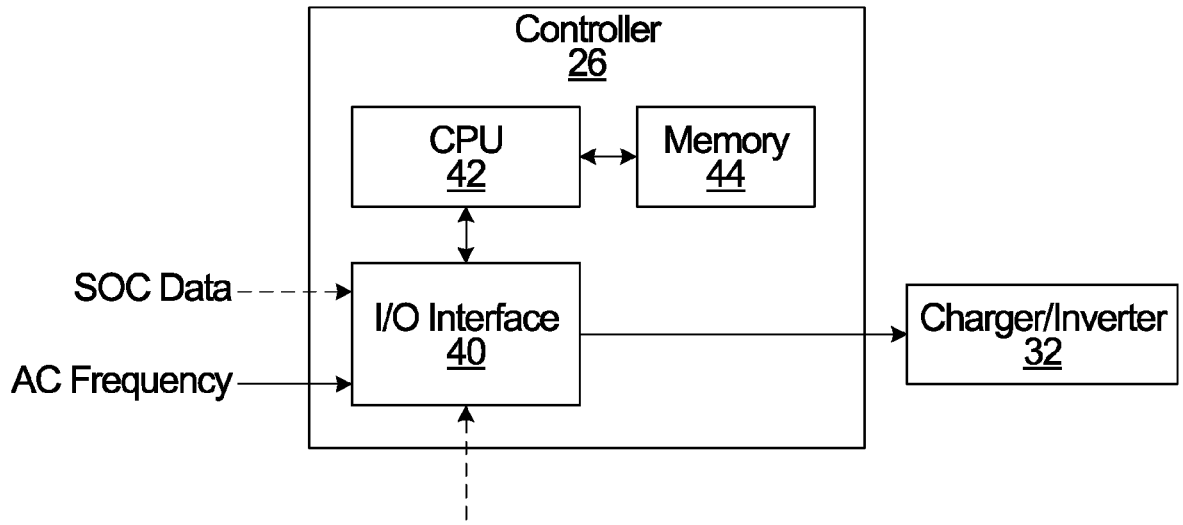
FIG. 4 is a more detailed block diagram of the controller of FIGS. 2 and 3 in accordance with a non-limiting example of implementation of the invention.

With further reference to FIG. 4, the controller 26 is computer-based, including a machine-readable storage encoded with software for execution by one or more CPUs. The software defines logic, which determines how the charger/inverter 32 operates. Specifically, the controller 26 has an input/output (I/O) interface 40, at least one CPU 44 and a machine-readable storage, or memory, 44. The memory 44 is encoded with the software executed by the CPU 42. Signals representative of at least one AC characteristic of the electric energy into the power grid 20, such as frequency are communicated to the controller 26 via the I/O interface 40. The I/O interface 40 reads the AC characteristic, digitizes it and makes it available to the CPU 42 for processing. Similarly, data regarding a capacity of the battery 30 to inject energy into the electric power grid 20 may be communicated to the controller 26 via the I/O interface 40. One non-limiting example of such capacity is the state-of-charge {SOC} of the battery 30. The software is executed by the CPU 42 to process those inputs and direct the operation of the charger/inverter 32 accordingly, as further discussed below.

Local Response

Figure 5:
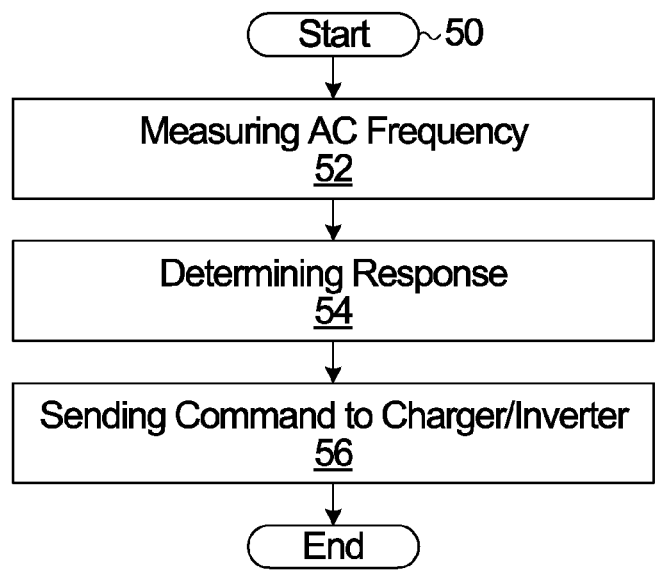
FIG. 5 is a flow chart of the process implemented by the controller of FIG. 4 for eliminating or reducing an imbalance between the generation side and the load side of the electric power grid of FIG. 1.

In one embodiment, the action implemented by the controller 26 is local, that is based on the state of equilibrium between the generation side of the electric power grid 20 and the load size thereof. With further reference to FIG. 5, a flow chart of the process implemented by the controller 26 is shown. After the controller 26 is in an active state (generally represented by a "Start" condition at step 50), the logic of the controller 26 proceeds to step 52 in which at least one AC characteristic of the electric energy into the power grid 20 is quantified to assess the state of equilibrium between the generation side of the electric power grid 20 and the load size thereof. In a preferred embodiment, one such AC characteristic of the electric energy is the frequency thereof. The frequency is preferably measured locally of the battery 30. The frequency may be measured directly at the power connection between the charger/inverter 32 or at a location that is not in the immediate vicinity of the battery 30 but still representative of the frequency in the grid 20. In other embodiments, the frequency may also be measured remotely (i.e., non-locally or not in the immediate vicinity of the battery 30) and communicated to the controller 26 via a data communication line, however a response to the frequency measurement is computed locally by the controller 26, as further discussed below.

The purpose of the frequency assessment is to detect an imbalance between the generation side of the electric power grid 20 and the load side thereof, which is reflected by a frequency deviation.

Typically, the larger the frequency deviation the larger the imbalance is. The output of step 52 is thus a frequency value. Since the controller 26 performs digital data processing, the frequency value is preferably generated in a digital format. Any suitable methodology may be used to convert the AC analog waveform into digital frequency information. A possible refinement is to perform several frequency measurements and to compound those measurements into a single representative value, such as by averaging them. Specifically, the controller 26 may be programmed to acquire over a predetermined period of time a frequency measurement which is stored in the memory 44 of the controller 26. In a specific example a frequency measurement can be made at every 100 ms interval, but this value can vary without departing from the spirit of the invention. Generally, the measurement interval depends on the processing speed of the CPU 42; the faster the CPU 42 and the system overall, the larger the number of frequency measurements in a given time period. The controller 26 may also be programmed to compute a rate of frequency variation versus time, as further discussed below.

The frequency measurement may be done by computing the period of one or more consecutive cycles of the AC voltage and deriving from the period information the fundamental frequency. When the frequency is measured at each 100 ms, and assuming a 100 ms measurement window, the system measures the period of at least one AC voltage cycle within that 100 ms window.

The memory of the controller 26 may keep a certain number of frequency measurements. As a new measurement of frequency becomes available, the measurement is stored in the memory 44 and the oldest measurement overwritten. All the frequency values that are stored in the memory 44 are averaged as a new frequency measurement becomes available. The average measurement smoothes out short term frequency variations that may not be representative of the grid frequency stability, and therefore the state of balance between the generation side of the electric power grid 20 and the load side thereof.

Note that instead of averaging the frequency measurements, other ways to blend this data into a single representative value exist without departing from the spirit of the invention.

Thus, the output of the processing at step 52 is a compound frequency measurement on the basis of which a response may be determined. The compound frequency measurement enables the identification of a frequency deviation, which is characteristic of an imbalance between the generation side of the electric power grid 20, and the load side thereof. The controller 26 implements decision logic based on the compounded frequency measurement in order to determine the appropriate response at step 54. Subsequently, the controller 26 may send a corresponding command to the charger/inverter 32 (via control signals, for example) as represented by step 56 to be described later.

Step 54 of the process thus uses the compounded frequency measurement as an input in determining the response required. In instances where the electric power grid 20 is stable and the frequency is within a nominal acceptable range the processing at step 54 determines that no response is necessary and no further action takes place, unless a remote command triggers an ancillary service, as further discussed below. This processing loop repeats constantly to provide a continuous monitoring of the grid frequency stability. However when the compounded frequency reflects a degree of grid frequency instability, step 54 invokes a response.

The main purpose of the response is to inject electrical energy from the battery 30 into the electric power grid 20 to eliminate or reduce the imbalance between the generation side of the electric power grid 20 and the load side thereof. It is advantageous to eliminate or reduce the imbalance as quickly as possible in order to stabilize the frequency of the AC supply. From that perspective, a fast system response is a desirable attribute.

In this example, the battery 30 outputs DC voltage. The charger/inverter 32 converts the DC voltage into AC voltage that is synchronized with the AC waveform in the electric power grid 20. The charger/inverter 32 also regulates the energy flow into the electric power grid 20 via the command sent by the controller 26 at step 56 by adjusting the AC voltage impressed at the power connections between the charger/inverter 32 and the electric power grid 20; the higher the RMS voltage the higher the rate of energy transfer from the battery 30 to the electric power grid 20.

Note that for applications where the energy storage device is other than a battery, the energy storage device may generate electrical energy in AC form, rather than in DC form, however for those applications a suitable conversion will be made. For instance, fly-wheels, which are rotating devices, generate an AC output that will be rectified into a stable DC form and in turn will be converted into AC form with a phase and frequency suitable for injection into the grid 20.

The degree of injection, or specifically the injection rate, of electrical energy from the battery 30 into the electric power grid 20 may be related to the severity of the frequency deviation. The larger the deviation, the more significant the injection rate of electrical energy will be. The specific relationship between the frequency deviation and the degree of injection of electrical energy can be linear or nonlinear.

It is appreciated that when a large number of energy storage devices are installed in the electrical network, each of them responds independently to the frequency deviation. However, since the responses are coherent and predictable they all add up to a combined injection of electrical energy in the electric power grid 20 that has a grid-wide effect.

Figure 6:
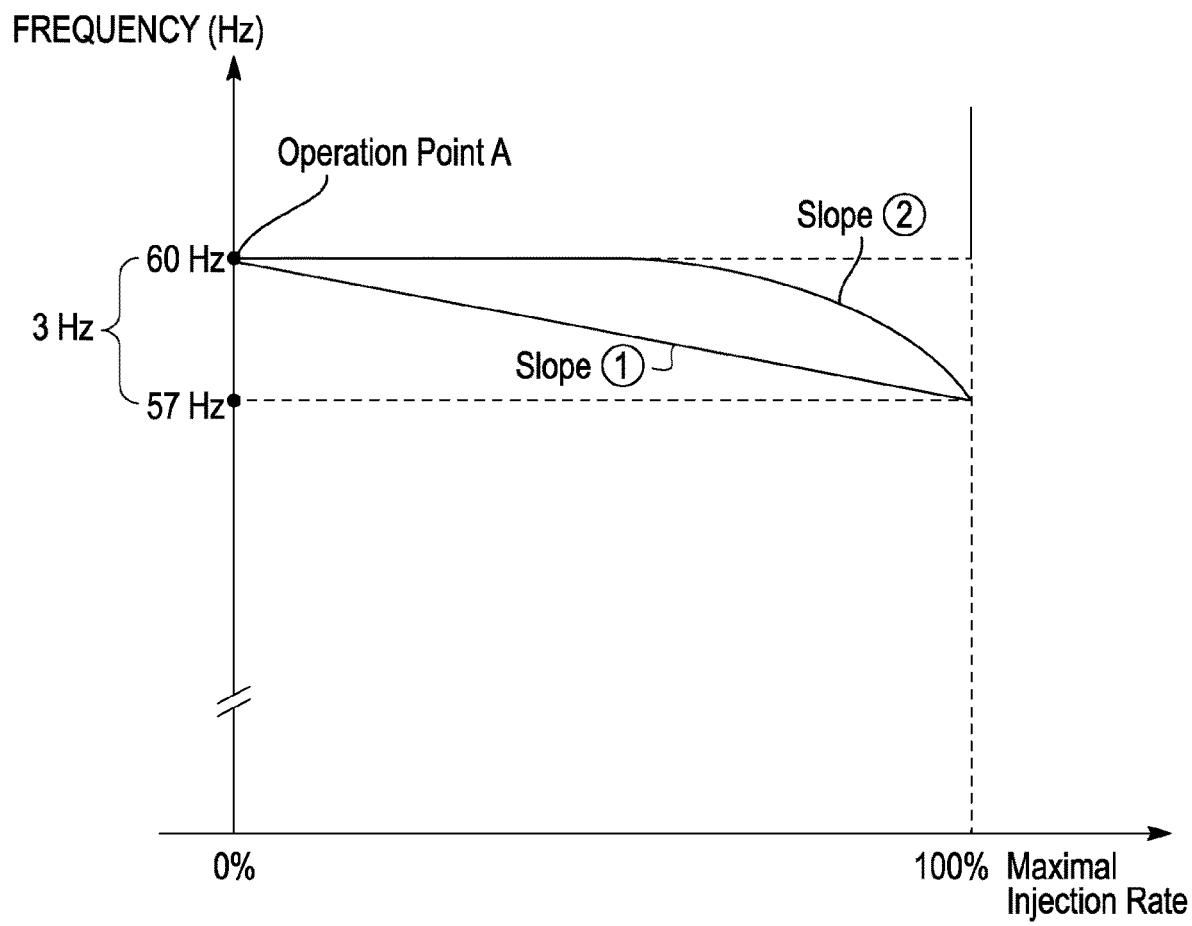
FIG. 6 is a graph depicting several specific examples of linear and non-linear injection of electrical energy in the power grid in relation to the frequency deviation.

FIG. 6 is a graph depicting several specific examples of injection of electrical energy in relation to the frequency deviation. In a first example, which is effective when the AC frequency is reduced as a result of a loss of a power generation unit, the response is represented by a line of constant slope (slope 1) which establishes a linear relationship between the frequency of the electric power grid 20 and the injection rate of electrical energy from the battery 30 into the electric power grid 20. Operation point A occurs at a rated frequency of 60 Hz however, when the frequency is decreasing below the rated value to a point at which a frequency deviation is considered to be occurring, the injection rate of electrical energy from the battery 30 into the electric power grid 20 is increased proportionally to the frequency deviation. The rate at which the injection is increased in relation to the frequency can be set to any desired value. For example, in the embodiment shown in FIG. 6, a frequency drop of 5% (3 Hz) will result in the battery 30 injecting electrical energy into the electric power grid 20 at 100% of the rate the battery 30 can safely provide. The value of this slope therefore corresponds to the frequency variation (in percentage) that creates a variation of the injection rate of electrical energy from the battery 30 into the electric power grid 20 of 100%.

The example described earlier in relation to FIG. 6 is based on a linear relationship between frequency and injection rate. Alternatively, the relationship may also be non-linear as shown with slope 2 in FIG. 6. The non-linear function has the advantage of providing a more aggressive injection rate effect with increasing frequency drop.

In some embodiments, a deadband may be implemented where no injection rate takes place as long as frequency variations are within the deadband boundaries. The deadband spread may be set on the basis of a frequency variation window within which frequency variations occur but are considered normal. In other words, as long as the frequency remains within that frequency variation window the frequency of the power grid is considered to be stable and no frequency deviation is occurring. A frequency instability occurs when the frequency exceeds the window boundaries. In a non-limiting example, a nominal AC frequency may be at 60 Hz, and a frequency variation window centered on the 60 Hz with a spread of ±0.1 Hz. This means that as long as the AC frequency remains within that window, it is considered stable and it will not trigger any response. However, a variation in frequency outside the range of ±0.1 Hz from the operation point at 60 Hz will cause the controller 26 to increase or decrease the injection rate accordingly.

Figure 7:
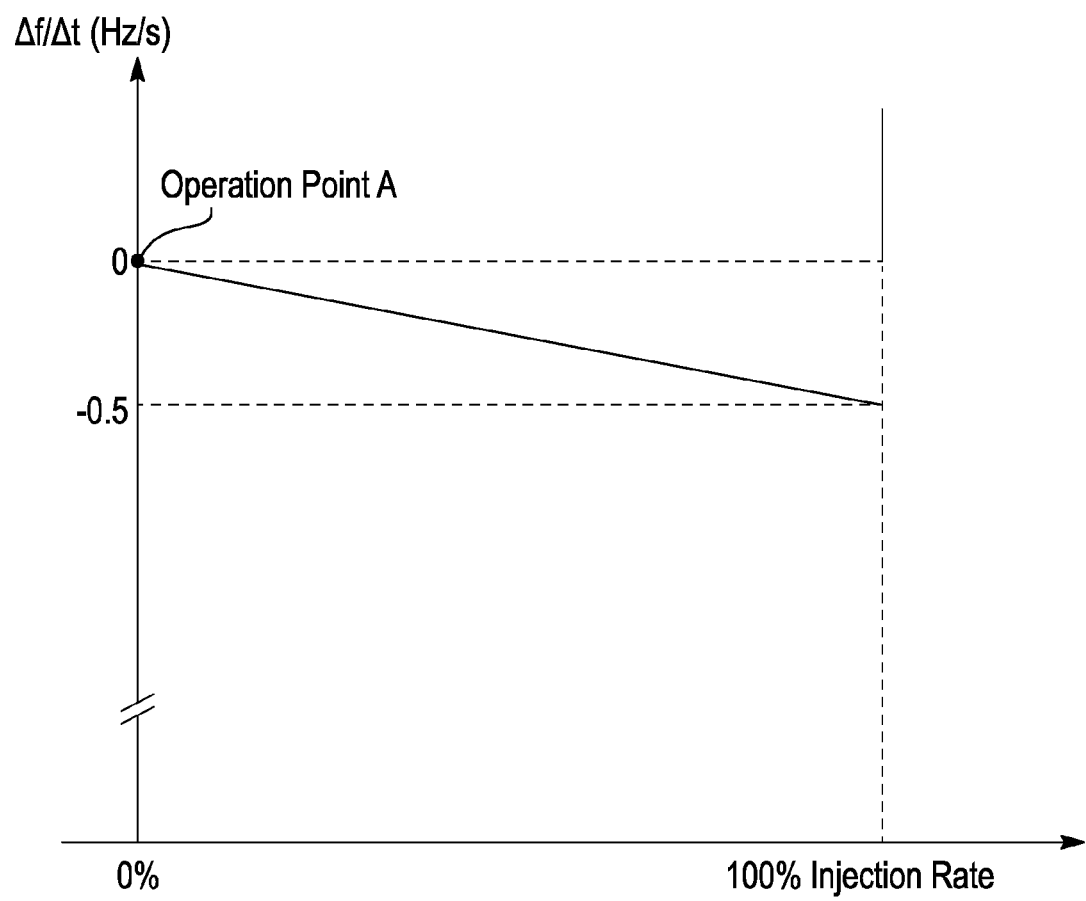
FIG. 7 is a graph depicting an example of linear injection of electrical energy in relation to the rate of frequency deviation.

FIG. 7 is a graph depicting several specific examples of injection of electrical energy in relation to the rate of frequency deviation. More specifically, the response is represented by a line of constant slope (slope 1), which establishes a linear relationship between the rate of variation of the frequency versus the injection rate of electrical energy from the battery 30 to the electric power grid 20. Operation point A occurs at a rated frequency of 0 Hz/sec (frequency does not vary) when the injection rate is 0%. However, when the frequency rate of variation versus time is decreasing below the rated value to a point at which a frequency deviation is considered to be occurring, the injection rate is increased proportionally to the frequency rate of variation versus time. The rate at which the injection rate is increased in relation to the frequency rate of variation versus time is determined on the basis of the measured rate of frequency variation versus time; the higher this rate the higher the rate at which the injection rate is increased.

In the representation of FIG. 7 a zero slope would trigger an instant 100% injection rate of electrical energy into the electric power grid 20 so the lower the slope, the more aggressive the response is. In that example, a slope of −0.5 Hz/sec will trigger an injection rate of 100% when the rate of frequency decrease is of −0.5 Hz/sec or higher. In other words, the injection by the battery 30 will begin at any deviation from 0 Hz/sec and reach a 100% injection rate at about −0.5 Hz/sec. Preferably this range could be from about −0.05 Hz/sec to about −0.1 Hz/sec.

While the relationship between the rate of variation of the frequency versus the injection rate of electrical energy from the battery 30 is linear in FIG. 7, non-linear relationships are also possible. The non-linear function has the advantage of providing a more aggressive response with increasing frequency deviation.

Figure 8:
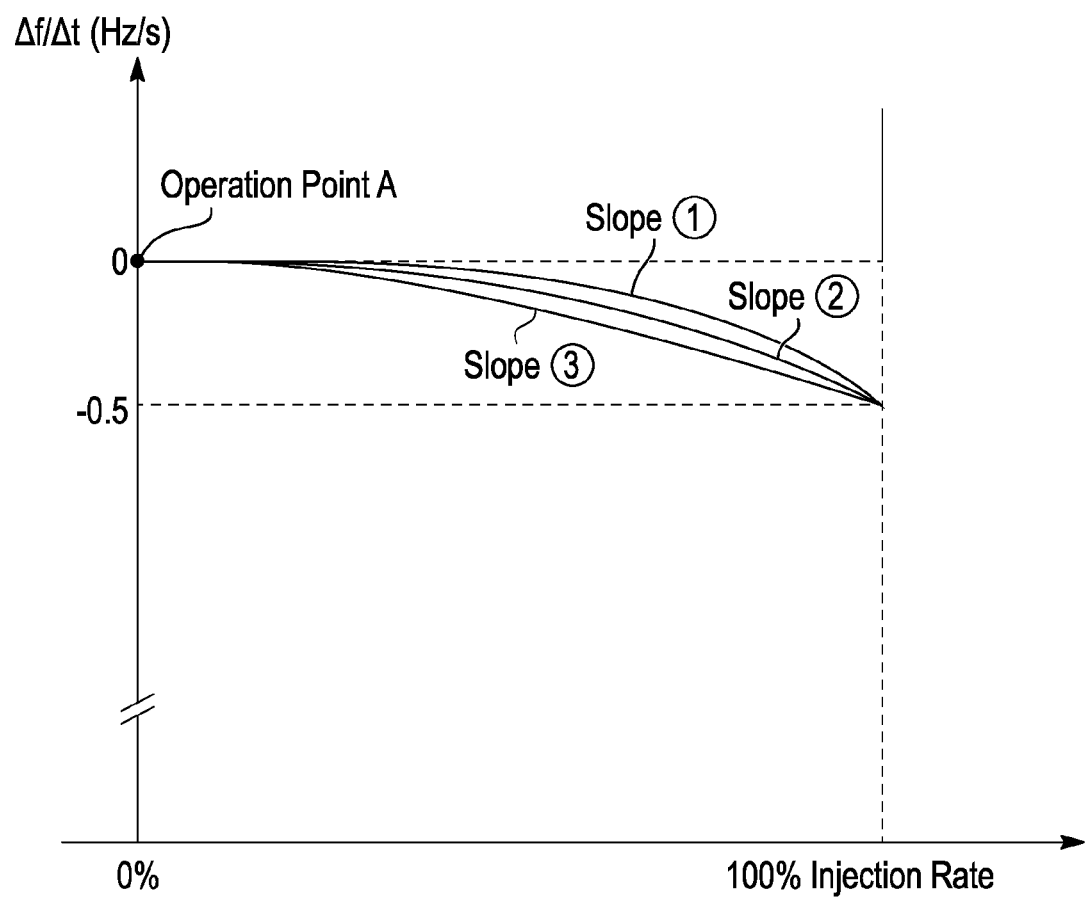
FIG. 8 is a graph depicting several specific examples of non-linear injection of electrical energy in the power grid in relation to the rate of frequency deviation.

In this instance, and with further reference to FIG. 8, the rate of variation of the frequency versus time determines the degree of aggressiveness of the injection rate of electrical energy from the battery 30 into the electrical power grid 30. FIG. 8 shows three different response curves 1, 2 and 3, which are associated with different rates of frequency variation versus time.

A deadband may also be implemented where no injection takes place as long as the rate of frequency variation versus time is with the deadband boundaries, as discussed above.

Figure 9:
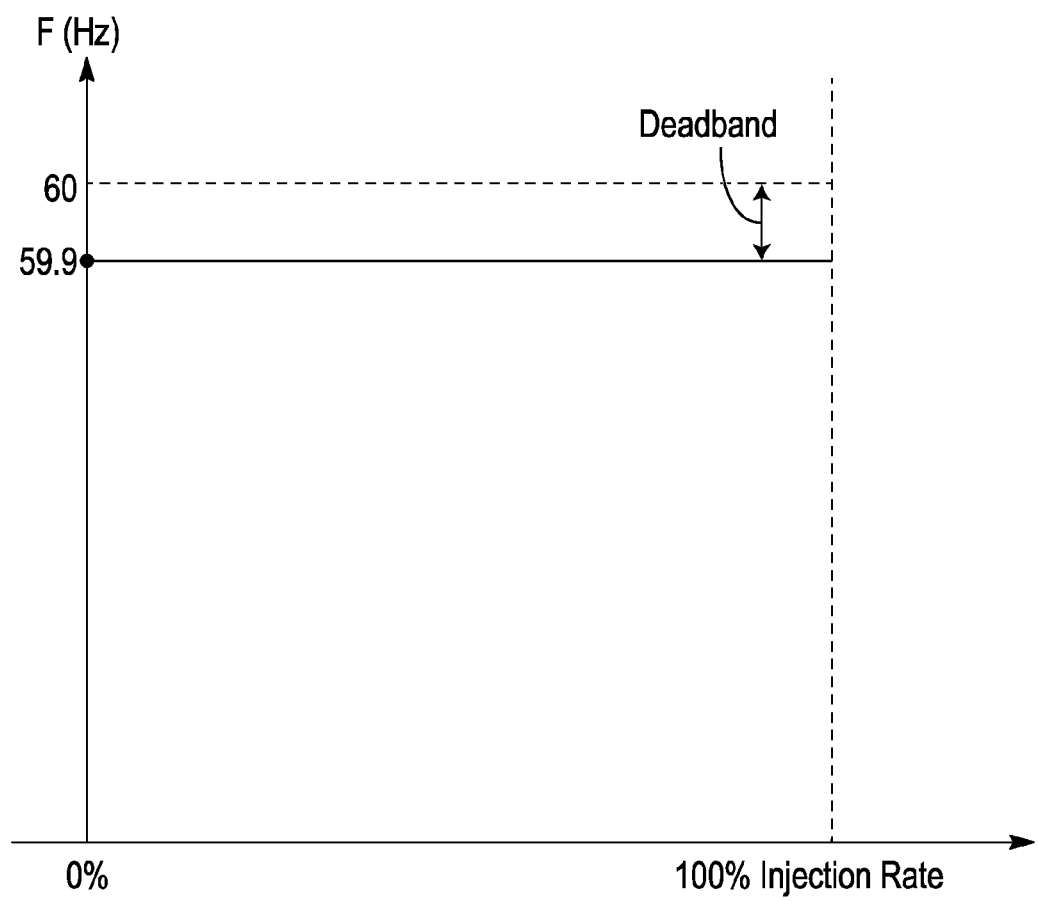
FIG. 9 is a graph depicting an example of "on-off" injection of electrical energy in relation to the rate of frequency deviation.

Yet another possible response is shown in FIG. 9 in which the response is binary. More specifically, as soon as the frequency is outside the deadband (i.e., as soon as a frequency deviation is considered to be occurring), the injection rate is set to 100%. This binary strategy can be used on its own or in combination with the strategies described earlier. When used alone, the controller 26 does not modulate the injection rate of electric energy into the electric power grid 20 and therefore solely provides protection against severe frequency deviations. The response is thus triggered when the rate of frequency variation versus time exceeds a threshold that is indicative of a serious imbalance between the generation side of the electric power grid 20 and the load side thereof.

Instead of using a rate of frequency variation versus time as a basis for determining the appropriate response, the acceleration of the frequency variation could be used, which provides yet another order of prediction of the frequency deviation. A response based on the acceleration of the frequency variation can be implemented in a similar way to the response based on the rate of frequency variation versus time. More specifically, the acceleration of the frequency variation versus time is computed by the controller 26 taking a second order derivative of the frequency versus time and loop-up tables or an algorithm used to derive the appropriate injection rate.

The examples of responses described above provide an adaptive response to the severity of frequency deviation and can this protect the electric power grid 20 from collapsing events when large power generation deficits occur or when the inertia of the electric power grid 20 is low. Since the response notably uses as a factor the rate of frequency variation, hence it is forward looking and not just responsive to the instant conditions, it can adapt the response such that the injection rate is higher than the rate of frequency variation as it exists immediately following the occurrence of the imbalance, and that will continue without reduction if no such injection would occur.

Remote Commands

In a preferred embodiment, the controller 26 is capable to establish a local response to address certain grid events, and in addition can also implement remote commands sent from a remote location, such as a central office 34 via a data communication line. These remote commands generally are not responsive to events currently occurring in the electric power grid 20. Therefore, by opposition to the local response based on the frequency of electrical energy transmitted into the electrical power grid 30 which is reactive in nature, the remote commands from the central office 34 are preventive in nature and designed to put the electric power grid 30 in a condition that is best suited to handle certain conditions which are expected to occur in the future. An exception to this rule is the ancillary service providing frequency regulation for large grids or interconnected ones, where the inertia of the grid is vast and the occasional loss of a power generation unit will trigger a frequency decline but that decline is slow and does not require an immediate response as in the case of a small grid with limited inertia. Accordingly, the ancillary service relating to frequency regulation is one which would effectively be performed to respond to a condition of the grid.

Figure 10:
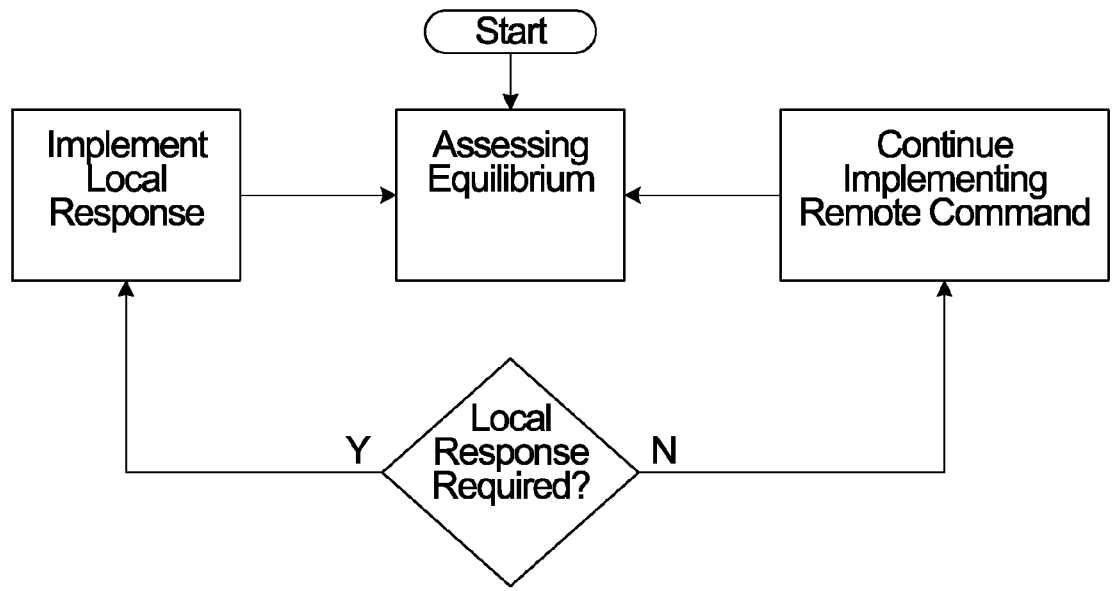
FIG. 10 is a flowchart of a process for implementing a local response during execution of a remote command.

The controller includes logic to handle the interplay between a local response and remote commands. With further reference to FIG. 10, a process for managing both local responses and remote commands is described. After the state of equilibrium between the generation side of the electric power grid 20 and the load size thereof has been determined, as described above, a decision is made by the controller 26 as to whether a local response is required. If a local response is required, the local response is then implemented by the controller 26. In parallel, remote commands sent by the central office 34 may be received by the controller 26 or may be currently implemented. In a specific example of implementation, if a local response is not required the remote commands will be implemented by the controller 26. The local response, when required, therefore overrides the remote commands. If a remote command is currently being implemented and the controller 26 senses grid conditions that require a local response, then execution of the remote command is interrupted such that the local response can be implemented.

The remote commands may have a structure comprising a set of parameters that define what the energy storage device has to perform. In a non-limiting embodiment, the parameters may comprise a start time of the desired action, the type of action and an end time of the action.

The start time of the action indicates if the action is to be implemented immediately or at some specific future time. The type of action will typically indicate the injection rate of electrical energy into the electrical power grid 20 and whether the injection rate is constant or variable. The end time indicates a specific time at which the action is to terminate or after certain locally-measured condition have been met.

In this embodiment, the remote commands sent by the central office 34 may be used to deliver ancillary services that cannot be provided by the local response, as further discussed below.

In one non-limiting embodiment, the ancillary service may be a "stand-by" reserve. Essentially, the remote command specifies that the power grid 20 will require availability of reserves and will therefore 'reserve' the energy storage device for a certain period of time. The remote "stand-by" reserve command will typically define the stand-by window by defining the start time and end time, which may be of a duration of 10 minutes, 30 minutes or other. The controller 26 therefore will keep the energy storage device available during that stand-by window. To access the reserve capacity provided by the energy storage device during the stand-by window, an additional remote command is sent to trigger the energy injection into the grid. A remote command requesting the "stand-by" reserve may also include parameters such as the amount of energy that is put on stand-by and also a rate of injection of the energy into the power grid. Alternatively the rate of injection and/or the start of the injection may be computed locally, on the basis of the grid frequency measurement. Under this approach, the energy storage device is put on stand-by via a remote command but a local condition triggers the execution, which essentially becomes at that point a local response.

In another non-limiting embodiment, the ancillary service may be "peak shaving". Essentially, the load on the electric power grid 20 is reduced when the load during peak demand times exceeds the generation capacity of the electric power grid 20. The remote command specifies a period over which the load on the electric power grid 20 should be reduced, which may be a duration of hours during peak demand times, and may also include parameters such as a variation of the rate of injection of energy into the electric power grid 20 to increase generation which effectively acts as a load reduction action.

In another non-limiting embodiment, the ancillary service may be "ramping". Essentially, the remote command modulates the energy consumption (i.e., the load) of the electric power grid 20 over long periods of time to counterbalance expected variations of energy generation in the electric power grid 20. The remote command will typically define the length of the modulation which may be of a duration of several hours and may also include parameters such as a variation of the rate of injection of energy into the electric power grid 20 over the duration.

In another non-limiting embodiment, the ancillary service may be a frequency regulation. Frequency regulation is suitable when the electric power grid 20 is large and meshed, in which case the inertia of the electric power grid 20 is large. Frequency regulation may therefore be useful to respond to frequency deviation events that will not have an immediate impact on the electric power grid 20 due to its large inertia. The frequency regulation is "conventional", that is an operator in the central office 34 manually sends a remote command via the data communication line to the controller 26 to control the rate of injection of the electrical energy into the electric power grid 20 and therefore adjust the load on the electric power grid 20.

The ancillary service may be any other suitable ancillary service in other embodiments.

Post-Local Response Behavior

After the local response has been implemented, the controller 26 notifies the central office 34 of the event via the data communication line. The controller may notably communicate information (or post-event information when a frequency deviation event has occurred) that can be saved as a historical pattern within the memory 44 of the controller 26 or directly at the central office 34. The information communicated enables the central office 34 to assess the performance of the population of the energy storage devices installed in the grid.

The information communicated may notably comprise an amount of energy injected into the electric power grid 20 (in MWatts) and the SOC of the battery 30 or an equivalent parameter which represents the remaining capacity of the battery 30 to further inject electrical energy into the electrical power grid 20.

Figure 11:
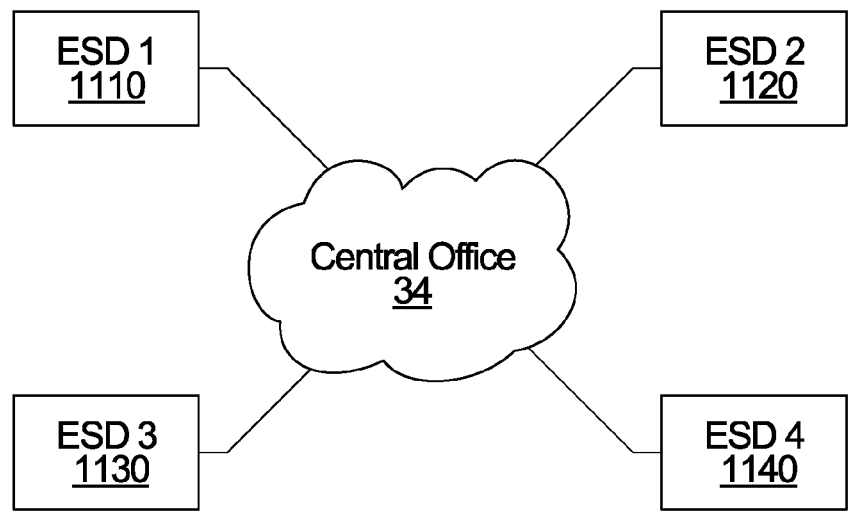
FIG. 11 is a block diagram of an electric power grid connected to four energy storage devices, in accordance with a non-limiting example of implementation of the invention.
Figure 12:
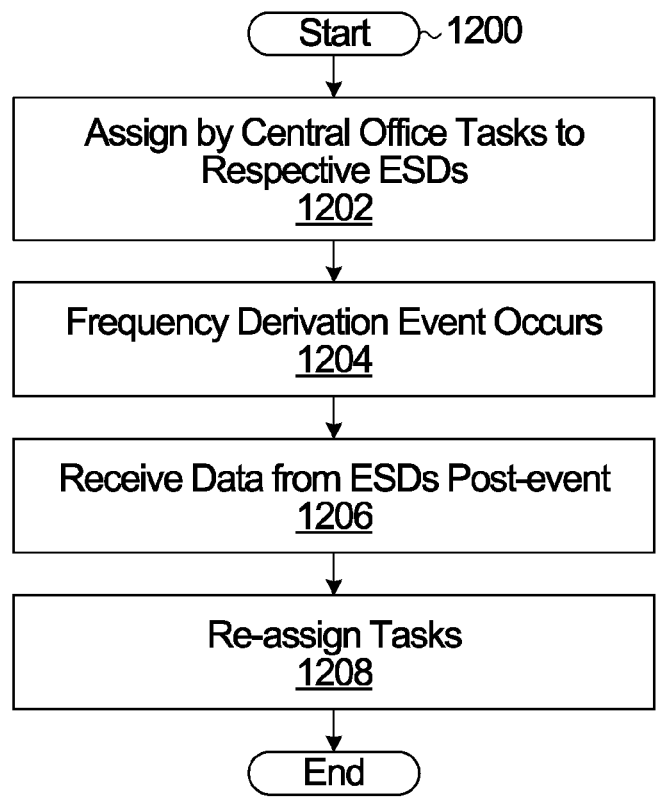
FIG. 12 is a flow chart of a process implemented by the controller of FIG. 4 for re-assigning tasks of energy storage devices following a frequency deviation event.

In a non-limiting embodiment, the tasks of distinct ESDs may be redistributed according to the local response that one or more of those ESD provided. With further reference to FIGS. 11 and 12, an electric power grid 20 connected to four ESDs 1110, 1120, 1130 and 1140 is shown. A flow chart of the process implemented by the central office, which typically is the management center of power grid 20 is also shown. After the central office controller is in an active state (generally represented by a "Start" condition at step 1200), the logic of the central office controller proceeds to step 1202 in which the central office 34 assign specific remote commands to each one of the ESDs 1110, 1120, 1130 and 1140. For example, the ESDs 1110 and 1120 may be assigned a task of providing stand-by reserve capacity for 30 minutes at a future time, while the ESDs 1130 and 1140 may remain idle. In a next step 1204 a frequency deviation occurs that is characteristic of an imbalance between the generation side of the electric power grid 20 and the load size thereof. The central office controller receives post-event information from each one of the ESDs 1110, 1120, 1130 and 1140 at step 1206 and re-assesses the tasks of each one of the ESDs 1110, 1120, 1130 and 1140 at step 1208 based on the post-event information received at step 1206. For example, after the under-frequency event, the central office controller may determine that the local response performed by the ESDs 1110 and 1120 has depleted the respective batteries to a point they cannot provide anymore the standby reserve capacity of 30 minutes, the central office controller will re-assign the stand-by reserve capacity commands, assuming the other ESDs 1130 and 1140 have an SOC sufficient to provide the desired stand-by reserve capacity. In this specific example, the central office controller will send a remote command to the ESDs to cancel the stand-by reserve capacity earlier command and send a remote command to the ESDs to request availability in order to provide the reserve capacity.

More generally the step 1208 is performed by logic that determines if the ESDs are in a condition to carry out the remote commands that have been attributed to them pre-event. That determination is done in large part by observing the residual SOC of each ESD and comparing it to an estimate of the energy requirement to comply with the previously issued remote command. In the event, the residual energy capacity of a particular ESD is not sufficient to comply with the remote command, the central office controller will re-task the remote commands, to the extent another ESD has more energy available. The re-tasking operation may involve, for instance, a task switch where a command that carries a lower energy requirement is directed to the ESD that has the lower SOC, assuming of course it is still sufficient to comply with the command, and the command that has a high energy requirement is directed to the ESD that has a comparatively high SOC.

Partitioning Battery Capacity

Figure 13:
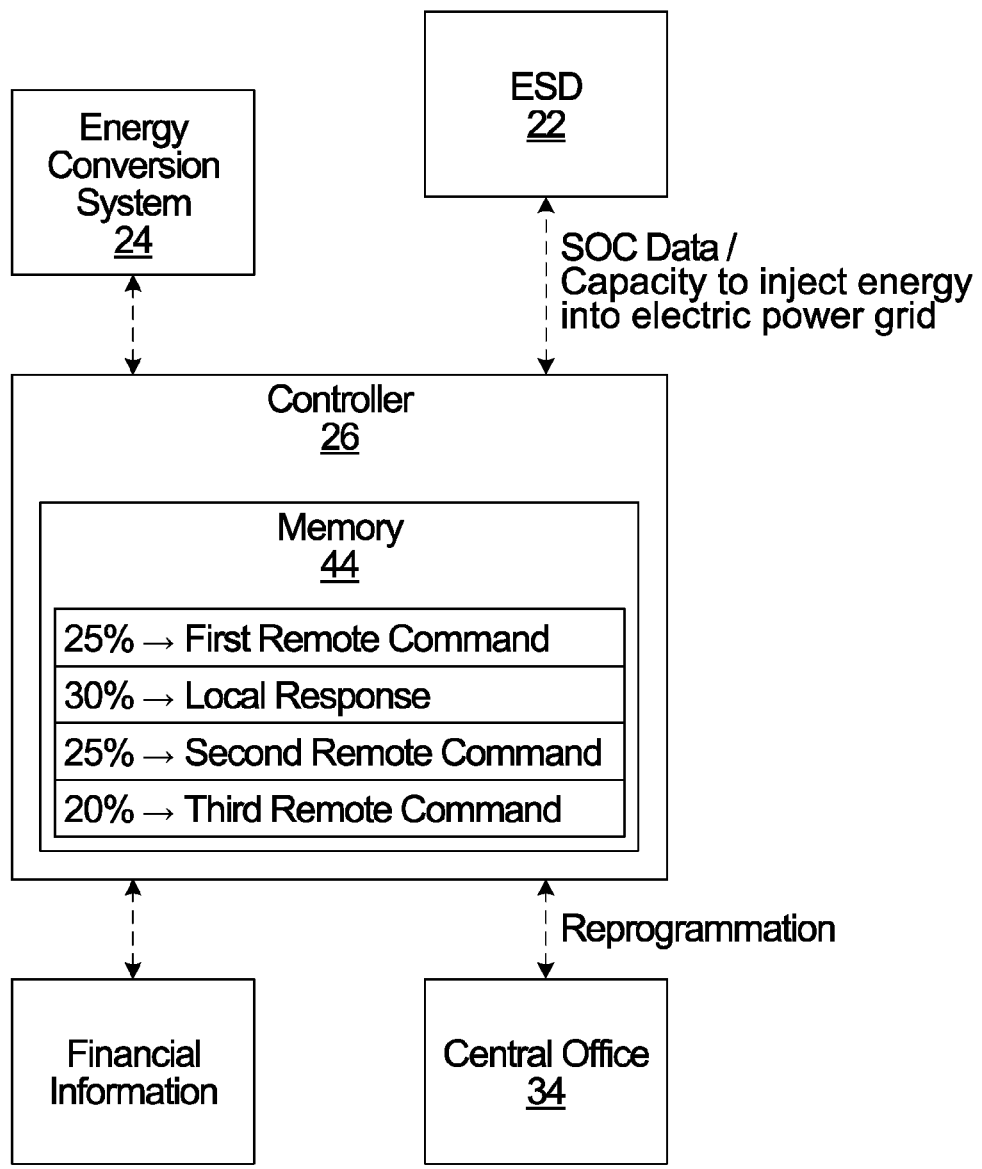
FIG. 13 is a black diagram showing a plurality of zones in a memory of the controller of FIG. 4.

Instead of using a hierarchal approach to the operation of the energy storage device, where a grid event triggers a local response that will interrupt or postpone the execution of a remote command, the battery capacity can be partitioned such as to reserve capacity for different events or commands. In a non-limiting embodiment, and with further reference to FIG. 13, the memory 44 of the controller 26 contains data which represents multiple zones that may be virtually depleted, from a standpoint of the SOC of the ESD 22/battery 30, each associated with a particular remote command/local response. In this non-limiting example, 30% of the capacity is attributed to the "local" response, 25% is attributed to a first remote command, 25% is attributed to a second remote command and 20% is attributed to a third remote command. The advantage of this arrangement is that the energy storage device can perform a local response and simultaneously execute a remote command.

The controller 26 performs an accounting operation when energy is injected into the power grid 20 and allocates the withdrawn energy from the appropriate zone. For example, if a first remote command is executed, say providing a stand by reserve capacity which corresponds to the zone associated with the first command, and assuming the required stand by reserve corresponds to the entire 25% battery capacity, then the controller 26 will not allow the SOC of the battery to drop below a level that is less than 25% of the overall capacity. Accordingly, if a local response is required during the time the stand by reserve capacity is called, the amount of electrical energy injected into the grid to provide the local response will not exceed 30% of the overall battery capacity. In this fashion, the energy storage device can multitask.

The battery capacity allocation can be re-programmed either by the local controller 26 or as a result of a command send by the central office 34. There may be instances where it may be more advantageous to allocate a larger segment of the battery capacity for local response rather than to a remote command.

When 100% of the SOC has been depleted, the controller 26 notifies the central office 34 that no more electrical energy may be injected into the electrical power grid 20 by the ESD 22/battery 30.

While the local response may not be executed at the same time as the remote commands, the three remote commands could be executed concurrently. The remote command may also reprogram the memory 44 of the controller 26.

The invention claimed is:

1. A method for managing the operation of an AC power grid to which connect a plurality of electrical storage devices, the AC power grid being characterized by a dynamic state of balance between power generation and load, the method comprising:
   a. sensing a characteristic of an electrical energy supplied by the AC power grid to the plurality of electrical storage devices;
   b. detecting an occurrence of a power generation deficit in the AC power grid on the basis of the characteristic;
   c. in response to detection of the power generation deficit within the AC power grid, controlling with a power control device an injection of electrical energy by a relevant one of the plurality of electrical storage devices to lessen the power generation deficit within the AC power grid; and
   d. post injection of the electrical energy and in the absence of a power generation deficit in the AC power grid, measuring a remaining capacity of the relevant one of the energy storage devices;
   e. determining on the basis of the remaining capacity if the relevant one of the electrical storage devices is capable to deliver an ancillary service to the AC power grid, which includes injection of additional electrical energy into the AC power grid from the relevant one of the electrical storage devices according to predetermined parameters;

f. when the remaining capacity indicates that the relevant one of the energy storage devices is capable to deliver the ancillary service, controlling the power control device to deliver the ancillary service;

g. when the remaining capacity indicates that the relevant one of the energy storage devices does not have enough capacity to deliver the ancillary service, communicating via the central office with another one of the plurality of electrical storage devices to deliver the ancillary service.

2. The method of claim 1, wherein the plurality of electrical storage devices include batteries.

3. The method of claim 1, wherein the ancillary service is a stand-by-reserve.

4. The method of claim 1, wherein the ancillary service is peak shaving.

5. The method of claim 1, wherein the ancillary service is ramping.

6. The method of claim 1, wherein the ancillary service is frequency regulation.

7. The method of claim 1, including sending a remote command to the power control device to implement the ancillary device.

8. The method of claim 7, wherein the remote command conveys the predetermined parameters.

9. The method of claim 8, wherein the predetermined parameters include a start time.

10. The method of claim 8, wherein the predetermined parameters include an end time.

11. The method of claim 8, wherein the predetermined parameters define the ancillary service.

12. The method of claim 2, wherein the characteristic of the electrical energy is a frequency of the electrical energy.

13. The method of claim 12, wherein sensing the frequency of the electrical energy is performed by a sensor proximal to a power supply connection between the relevant one of the plurality of electrical storage devices and the AC power grid.

14. The method of claim 12, further comprising deriving from the frequency of the electrical energy a magnitude of the power generation deficit.

15. The method of claim 14, including controlling the injection of electrical energy by the relevant one of the plurality of electrical storage devices according to the magnitude of the power generation deficit.

16. The method of claim 15, wherein the magnitude of the power generation deficit is derived by determining a difference between the frequency of the electrical energy and a nominal frequency.

* * * * *